United States Patent

Müller et al.

[11] Patent Number: 6,042,756
[45] Date of Patent: Mar. 28, 2000

[54] PROCESS FOR THE MANUFACTURE OF MOULDED ARTICLES THAT ARE PARTLY COLORED OR HAVE REGIONS OF DIFFERENT COLORS

[75] Inventors: Achim Müller, Aschaffenburg; Bernhard Seiferling, Goldbach; Axel Heinrich, Aschaffenburg, all of Germany

[73] Assignee: Novartis AG, Basle, Switzerland

[21] Appl. No.: 08/875,341

[22] PCT Filed: Jan. 22, 1996

[86] PCT No.: PCT/EP96/00244

§ 371 Date: Jul. 30, 1997

§ 102(e) Date: Jul. 30, 1997

[87] PCT Pub. No.: WO96/23648

PCT Pub. Date: Aug. 8, 1996

[30] Foreign Application Priority Data

Feb. 2, 1995 [EP] European Pat. Off. ............. 95810070

[51] Int. Cl.[7] ...................................................... B29D 11/00
[52] U.S. Cl. ............................ 264/1.36; 264/1.7; 264/1.1
[58] Field of Search .............................. 264/1.1, 1.7, 2.2, 264/1.36, 1.29, 494, 496, 1.38

[56] References Cited

U.S. PATENT DOCUMENTS

| | | | |
|---|---|---|---|
| 4,022,855 | 5/1977 | Hamblen | 264/496 |
| 4,073,577 | 2/1978 | Hofer . | |
| 4,123,407 | 10/1978 | Gordon . | |
| 4,208,362 | 6/1980 | Diechert et al. | 264/1.7 |
| 4,252,421 | 2/1981 | Foley . | |
| 4,553,975 | 11/1985 | Su . | |
| 4,701,288 | 10/1987 | Cook et al. | 264/1.7 |
| 4,874,562 | 10/1989 | Hyon et al. | 264/1.1 |
| 5,110,513 | 5/1992 | Puvilland | 264/19 |
| 5,116,112 | 5/1992 | Rawlings | 264/1.7 |
| 5,158,718 | 10/1992 | Thakrar et al. | 264/496 |
| 5,252,056 | 10/1993 | Horner . | |
| 5,352,245 | 10/1994 | Su . | |
| 5,508,317 | 4/1996 | Muller . | |
| 5,534,101 | 7/1996 | Keyworth et al. | 264/1.29 |
| 5,782,460 | 7/1998 | Kretzschmar et al. | 264/1.36 |

FOREIGN PATENT DOCUMENTS

| | | |
|---|---|---|
| 0164847A2 | 12/1985 | European Pat. Off. . |
| 0170594A2 | 2/1986 | European Pat. Off. . |
| 0307322 | 3/1989 | European Pat. Off. . |
| 4-078505 | 3/1992 | Japan . |
| 381854 | 11/1964 | Switzerland . |

*Primary Examiner*—Mathieu D. Vargot
*Attorney, Agent, or Firm*—R. Scott Meece; Robert J. Gorman, Jr.

[57] ABSTRACT

For the fast and rational manufacture of moulded articles, specifically contact lenses, that are partly colored or have regions of different colors, by the casting process, measured amounts of two or more crosslinkable materials of different colors are introduced into the casting mould in the uncrosslinked stated unmixed and, after closing the casting mould, are crosslinked together. By suitably controlling the introduction of the different crosslinkable materials with regard to location and/or time the merging of the colors and the transitions between the colors in the contact lens are influenced in a controlled manner.

16 Claims, 6 Drawing Sheets

PROCESS FOR THE MANUFACTURE OF MOULDED ARTICLES THAT ARE PARTLY COLORED OR HAVE REGIONS OF DIFFERENT COLORS

BACKGROUND OF THE INVENTION

The invention relates to a process for the manufacture of moulded articles that are partly coloured or have regions of different colours according to the preamble of the independent claim and to a moulded article manufactured by the process, having at least two regions, especially annular regions, of different colours. The invention relates specifically to the manufacture of optical moulded articles, especially contact lenses.

Coloured contact lenses are very common. In many cases, there is a need for the contact lenses not to be coloured over their entire area but to be coloured only in a central region while the peripheral region is to be substantially transparent.

For the manufacture of contact lenses of uniform colour throughout it is known to use an appropriately dyed monomer mixture from which the contact lenses are then manufactured in conventional manner, especially by the casting process. That casting process is described inter alia in U.S. Pat. No. 5,252,056. It is not possible in that manner, however, to manufacture contact lenses having partly coloured regions or regions of different colours.

Various processes are known for the manufacture of partly coloured contact lenses. According to one known process, disclosed, for example, in U.S. Pat. No. 4,553,975, a hydrated contact lens is masked at its periphery and immersed in a dyeing bath. The dyeing process typically lasts from 25 to 65 minutes and is carried out at temperatures of approximately 44° C. Subsequently, the dye has to be fixed and the contact lens has to be extracted in a time-consuming manner. In another known process, described inter alia in U.S. Pat. No. 5,352,245, a dry contact lens manufactured by the casting process is printed with a stamp while it is still on the male half of the casting mould. After the printing operation, the dye has to be fixed and the contact lens has to be hydrated and extracted in a time-consuming manner. A feature common to both known processes, therefore, is that a (colourless) contact lens has to be manufactured first and then has to be dyed in further steps in a time-consuming manner.

By means of the invention a process of the generic kind is to be so improved that it does not require fixing of the dye and extraction of the moulded article and that consequently makes possible simpler and substantially faster manufacture of moulded articles, especially optical moulded articles and specifically contact lenses, that are partly coloured or have regions of different colours.

According to the invention, the process that solves that problem is one in which measured amounts of two or more crosslinkable materials of different colours are introduced into the casting mould in the uncrosslinked state unmixed, and, after closing of the casting mould, are crosslinked.

By means of those measures according to the invention the moulded article, specifically the contact lens, is given its coloration during its actual manufacture by the casting process and the laborious after-treatment that is otherwise customary becomes unnecessary. As a result, the process is especially fast and is particularly suitable for the rational mass production required, for example, in the case of so-called daily disposable contact lenses.

Other advantageous measures and preferred forms of the process will be apparent from the dependent claims. By means of those measures it is possible to influence the distribution of the differently coloured regions and the merging of the colours and the transitions between the colours in a controlled manner.

DESCRIPTION OF THE DRAWINGS

The invention is described in detail below with reference to Examples and with reference to the drawings in which.

DETAILED DESCRIPTION OF THE INVENTION

The following explanations relate, purely by way of example, only to the manufacture of contact lenses. They apply analogously, however, also to the manufacture of other optical moulded articles and moulded articles quite generally.

Figure 1:
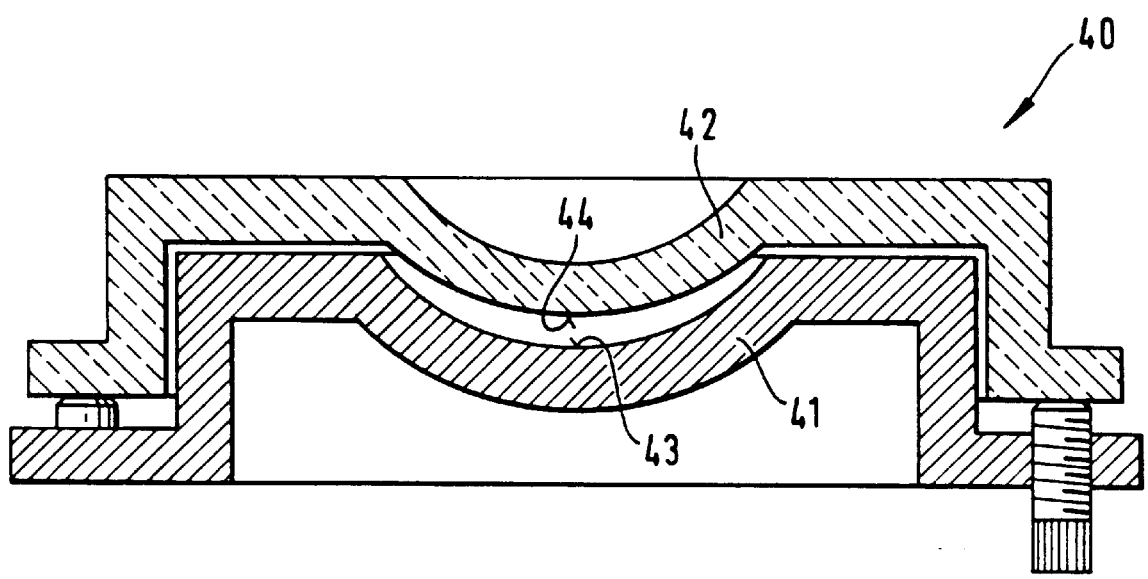
FIG. 1 shows a section through a casting mould suitable for carrying out the process of the invention.

The process of the invention utilises, for example, a known casting process as described, for example, in EP-A-0 637 490. In that casting process, a measured amount of a crosslinkable material is introduced into an open casting mould in the uncrosslinked state by means of a suitable metering device. FIG. 1 shows an assembled casting mould 40 of that kind. It comprises essentially two mould halves, namely a female mould half 41 and a male mould half 42. The concave moulding surface 43 of the female casting mould half 41 determines the geometry of the front surface of a contact lens to be manufactured. The male casting mould half 42 has a hat-like shape with a convex moulding surface. The convex moulding surface 44 determines the geometry of the rear surface of a contact lens to be manufactured.

The two casting mould halves 41, 42 are usually manufactured by the injection-moulding process, a thermoplastic material, preferably polypropylene, usually being used as the mould material. More recently, however, preference has also been given to the use of casting moulds made of glass or quartz glass and also of metal.

After a measured amount of a crosslinkable material suitable for the manufacture of contact lenses has been introduced into the female casting mould half 41, the casting mould is closed, the crosslinkable material is crosslinked by exposure to a suitable form of energy, usually UV light, the casting mould is opened again and the finished contact lens is removed from the casting mould. It is also possible, however, to leave the finished contact lens in one of the casting mould halves and to use that mould half as part of the packaging. Such casting methods for the manufacture of contact lenses and apparatus suitable for that purpose are known in general (see, for example, U.S. Pat. No. 5,252,056 already mentioned) and therefore do not require further explanation.

Crosslinkable materials suitable for the manufacture of contact lenses are known to one skilled in the art in great number. There are understood by crosslinkable materials in this context, for example, monomers or monomer mixtures and solutions thereof, especially aqueous solutions, and preferably water-soluble, uncrosslinked polymers. A suitable monomer is, for example, 2-hydroxyethyl methacrylate (HEMA) as described inter alia in U.S. Pat. No. 4,073,577. Also suitable, for example, are monomer mixtures containing HEMA, as are described, for example, in U.S. Pat. No. 4,123,407. When using monomers there is, however, the disadvantage that subsequent extraction is required. Especially suitable as uncrosslinked materials, therefore, are uncrosslinked water-soluble polymers and solutions thereof.

Water-soluble polymers are especially derivatives of polymeric 1,2- or 1,3-diols, more especially derivatives of polyvinyl alcohol (PVA), or derivatives of copolymers of PVA. The derivatisation of corresponding 1,3-diols, such as PVA, is suitably carried out by modification of a portion of the 1,3-diol groups with side-chains that contain crosslinkable groups, especially vinylic groups. One suitable derivatisation comprises, for example, reacting portions of the 1,3-diol groups to form cyclic ketals that contain an olefinically unsaturated, electron-attracting, copolymerisable radical.

Especially suitable representatives of correspondingly derivatised PVA are, for example, pre-polymers, which are derivatives of a polyvinyl alcohol having a molecular weight of approximately at least 2000 that comprises from approximately 0.5 to approximately 80%, based on the number of hydroxyl groups of the polyvinyl alcohol, units of formula I

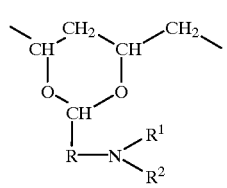

(I)

wherein

R is lower alkylene having up to 8 carbon atoms, $R^1$ is hydrogen or lower alkyl, and $R^2$ is an olefinically unsaturated, electron-attracting, copolymerisable radical having preferably up to 25 carbon atoms, as are disclosed in EP-A-0 641 806.

$R^2$ is, for example, an olefinically unsaturated acyl radical of the formula $R^3$—CO— wherein $R^3$ is an olefinically unsaturated copolymerisable radical having from 2 to 24 carbon atoms, preferably from 2 to 8 carbon atoms and especially from 2 to 4 carbon atoms.

In another embodiment, the radical $R^2$ is a radical of formula II

—CO—NH—$(R^4$—NH—CO—O$)_q R^5$—O—CO—$R^3$ (II)

wherein q is zero or one and $R^4$ and $R^5$ are each independently lower alkylene having from 2 to 8 carbon atoms, arylene having from 6 to 12 carbon atoms, a saturated bivalent cycloaliphatic group having from 6 to 10 carbon atoms, arylenealkylene or alkylenearylene having from 7 to 14 carbon atoms, or arylenealkylenearylene having from 13 to 16 carbon atoms, and wherein $R^3$ is as defined above.

The variables mentioned above have especially the definitions disclosed in detail in EP-A-0 641 806, the relevant disclosure of which is herewith incorporated into the description of the present invention.

Polymer solutions that are specifically suitable for the present invention are prepared, for example, according to Example 13 of EP-A-0 641 806. According to that Example, 300 g of PVA (e.g. Moviol Hoechst 4-88) are placed in a 2-liter double-walled reactor equipped with stirrer and thermometer, 800 g of deionised water are added and the mixture is heated, with stirring, at 95° C. After one hour, everything has dissolved to give a clear solution and the solution is cooled to 20° C. 27 g (0.155 mol) of methacrylamidoacetaldehyde-dimethylacetal, 440 g of acetic acid, 100 g of conc. hydrochloric acid (37%) and a sufficient amount of deionised water to produce a reaction solution of 2000 g in total (in the actual case: 333 g) are added. The mixture is stirred at 20° C. for 20 hours. The change in the acetate content can be determined by titration of the acetic acid.

The isolation can be carried out by means of ultrafiltration: the reaction mixture is cooled to 15° C. and adjusted to pH 3.6 with aqueous NaOH (5%). The polymer solution is filtered over a 0.45 μm filter and purified by ultrafiltration. The ultrafiltration is carried out by means of a 1KD Omega membrane from Filtron. Ultrafiltration is carried out until a residual content of sodium chloride of 0.004% is obtained. Before purification is completed, the solution is adjusted to pH 7 with 0.1N sodium hydroxide solution. After concentration, there are obtained 1995 g of a 14.54% polymer solution (92% of the theory); N content (Kjendahl determination)=0.683%, acetate content (determined by hydrolysis)=2.34 mol. equiv./g, inherent viscosity: 0.310, double bonds: 0.5 mol. equiv./g (determined by microhydrogenation), free hydroxy groups (determined by re-acetylation): 15.3 mol. equiv./g, GPC analysis (in water): mol. wt.=19 101, mol. no. 7522, mol. wt./mol. no.=2.54.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone and dried. The product so obtained has the same properties as that obtained by ultrafiltration.

The methacrylamidoacetaldehyde-dimethylacetal mentioned is obtained as follows: in a 3-liter reactor equipped with stirrer and cooling means, 220 g (5.5 mol) of sodium hydroxide are dissolved in 300 g of water and 700 g of ice. The sodium hydroxide solution is cooled to 10° C. and 526 g (5.0 mol) of aminoacetaldehyde-dimethylacetal and 50 mg of 4-hydroxy-2,2,6,6-tetramethylpiperidin-1-oxyl (radical inhibitor) are added. To this solution there are slowly added over a period of 3.5 hours at 10° C. 548.6 g (5.5 mol) of methacrylic acid chloride. When the addition is complete, the pH value slowly falls to 7.2 and no more amine can be detected by GC. The reaction mixture is extracted with 500 ml of petroleum ether in order to remove impurities and the aqueous phase is saturated with sodium chloride and extracted three times with 500 ml of tert-butyl methyl ether. The organic phase is dried with magnesium sulfate, filtered and concentrated using a rotary evaporator. The resulting 882.2 g of yellowish oil are slowly stirred by means of an Ultraturax into 2000 ml of petroleum ether at −10° C. The product crystallises and is filtered off and dried to yield 713.8 g of methacrylamidoacetaldehyde-dimethylacetal (86% of the theory), melting point 30–32° C., according to GC the product is 99.7% pure. A colourless polymer solution is prepared according to the example given above and used in the form of a 15% by weight aqueous solution to prepare a sol.

A coloured polymer solution is prepared, for example, by stirring X g of a 15% by weight polyvinyl alcohol (PVA) solution (in accordance with the example given above) first for one minute with 5.0 ml of a 0.5% by weight sodium carbonate solution and then for three minutes with a solution of Y mg of Duasyn-Blau-R-KG in Z ml of water. After titration with 0.01N hydrochloric acid to pH 7, the solution is twice diluted with 400 ml of water each time and ultrafiltered over a 3kD membrane (Filtron) in an ultrafiltration cell (Berghof). The 15% by weight coloured polymer solution is processed to form a sol. Examples of figures for X, Y and Z are given in Table 1.

To prepare the sol, 30 ml of a 15% by weight aqueous PVA solution and of the coloured polymer solution are concentrated using a rotary evaporator at 100 mbar and 40° C. to a solids content of 33% by weight. This solution is stirred intensively with 1.35 ml of a 1% by weight aqueous Irgacure 2959 solution (photoinitiator). The solution is introduced into polypropylene disposable syringes having a Luerlock connection, and the air bubbles in the solution are removed by centrifugation at 6000 g (10 min).

The expression "of different colours" is used to include also uncoloured or colourless crosslinkable materials and uncoloured or colourless regions of contact lenses. This means, for example, that a coloured and an uncoloured polymer solution are referred to as being of different colours. By the expression "measured amount" there is understood the usual amount required to fill the casting mould satisfactorily, it also being possible to provide for overfilling.

For the sake of simplicity, the process of the invention is described below with reference to an example in which only two crosslinkable materials of different colours, especially polymer solutions, are used, namely an uncoloured solution and a coloured solution. In principle, however, the number of crosslinkable materials of different colours that can be used in the process of the invention, and hence the number of regions of the finished moulded article having different colours, may also be larger. It is also possible to use in place of the preferred polymer solutions mentioned other crosslinkable materials described hereinbefore under the term crosslinkable materials.

Figure 2:
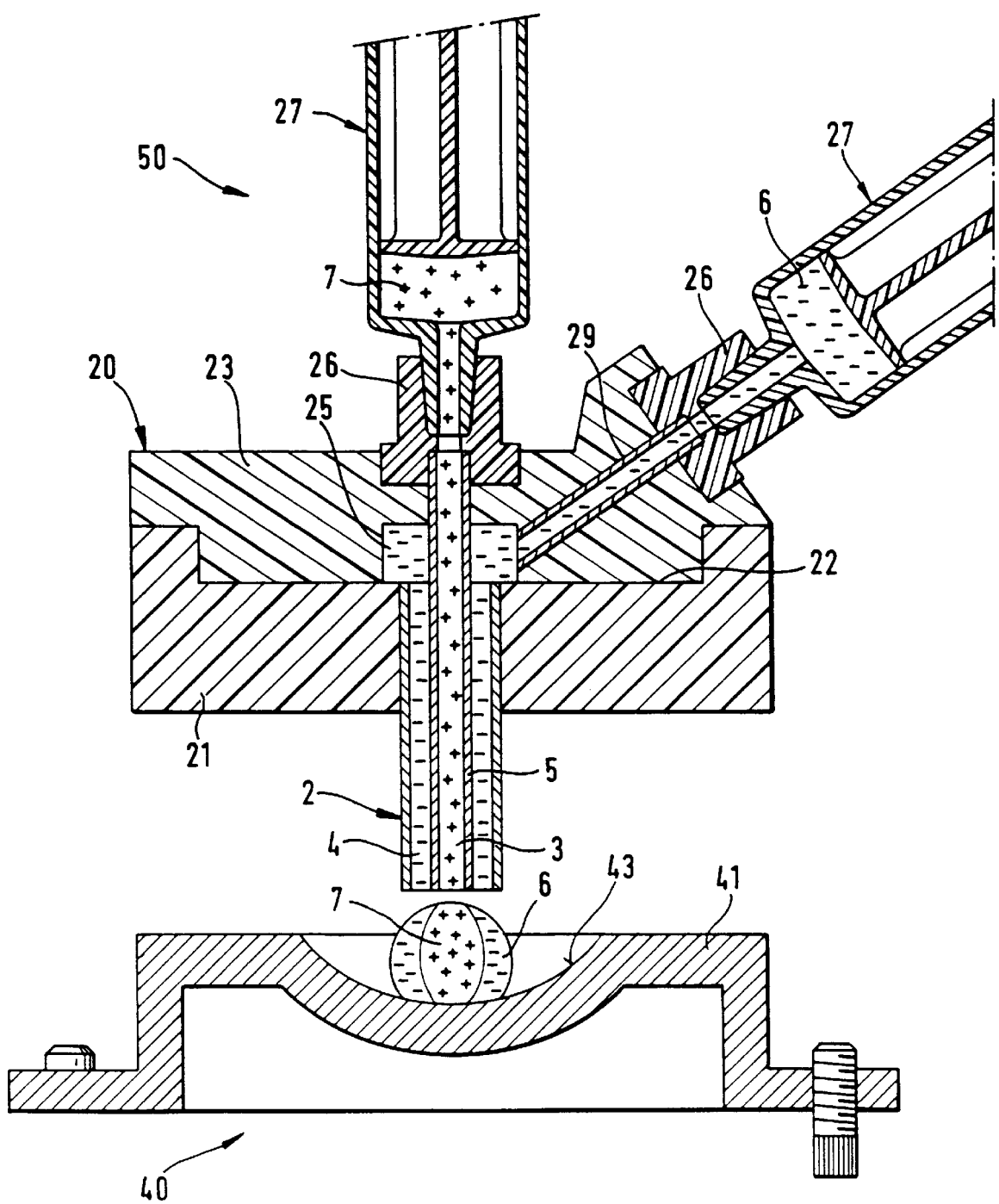
FIG. 2 shows a section through a metering device suitable, by way of example, for carrying out the process of the invention.

The introduction of the polymer solutions into the open casting mould 40, in this case the female mould half 41, is carried out by means of a metering device 50 shown, for example, in FIG. 2. The metering device 50 comprises a metering needle, designated 2 in its entirety, and a holding block 20. For a better understanding the metering needle 2 has been shown on an enlarged scale relative to the holding block 20. The metering needle 2 contains two coaxial metering nozzles, namely an inner nozzle 3 and an outer, annular nozzle 4. The inner nozzle 3 is separated by a partition wall 5 from the outer, annular nozzle 4 which surrounds it coaxially.

The metering needle 2 is fixed in the holding block 20 preferably by means of adhesive (for example an epoxy-based adhesive). The holding block 20 consists essentially of a lower part 21 and an upper part 23. The upper part 23, the lower boundary surface of which is provided with a recess 25, is fixedly mounted on the lower part 21, preferably by adhesive. The upper end of the outer, annular nozzle 4 ends flush with the parting surface 22 between the upper part 23 and the lower part 21.

The upper part 23 further has two bores, each of which leads at its outer end into a connection piece 26 to which the mentioned disposable syringes 27 with Luerlock connection containing the polymer solutions are detachably coupled. One of the bores receives the partition wall 5, which surrounds the inner nozzle 3, so that the inner nozzle 3 and the partition wall 5 extend into the associated connection piece 26. Accordingly, the inner nozzle 3 and the partition wall 5 are longer than the outer, annular nozzle 4. The second bore in the upper part 23 is provided with a tube 29, one end of which leads into the associated connection piece 26 and the other end of which ends flush with the boundary surface of the recess 25. In this manner, the two polymer solutions of different colours are introduced into the casting mould half 41 separately. The metering device described herein is merely an example. Any other metering devices can, of course, be used for carrying out the process of the invention.

By means of the metering device 50 a measured amount of the one polymer solution—either of the uncoloured polymer solution 6 or of the coloured polymer solution 7—is introduced into the casting mould half 41 from the associated disposable syringe 27 through the inner nozzle 3 and a measured amount of the other polymer solution is introduced into the casting mould half 41 from the associated disposable syringe 27, through the tube 29, through the cavity formed by the recess 25 and through the outer, annular nozzle 4. The two polymer solutions can be introduced into the casting mould half 41 simultaneously, with a partial overlap in time or separately in time. During the introduction, the metering needle 2 can also be moved relative to the casting mould 40 or the casting mould half 41 simultaneously or offset in time. The metering needle 2 may be moved in the direction of its longitudinal axis so that, for example, the metering needle 2 is always situated, throughout the introduction process, at the surface of the solution droplet being produced. In another example, the metering needle 2 may also be immersed in the solution droplet being produced. It is furthermore possible for the metering needle 2 to be moved transversely to its longitudinal axis. It is thereby possible, for example, for the polymer solutions to be distributed over regions of the casting mould or for the polymer solutions of different colours to be deposited in different regions of the casting mould.

These measures, the parameters of which are each optimised in an empirical manner, and a suitable viscosity of the crosslinkable polymer solutions have the effect that the two polymer solutions mix as little as possible in the open casting mould 40. This is shown symbolically in FIG. 2 for a first embodiment of the process of the invention. In the open casting mould, there is produced a solution droplet that consists of two separate regions each containing substantially only one of the polymer solutions, either the uncoloured solution 6 or the coloured solution 7.

Figure 3:
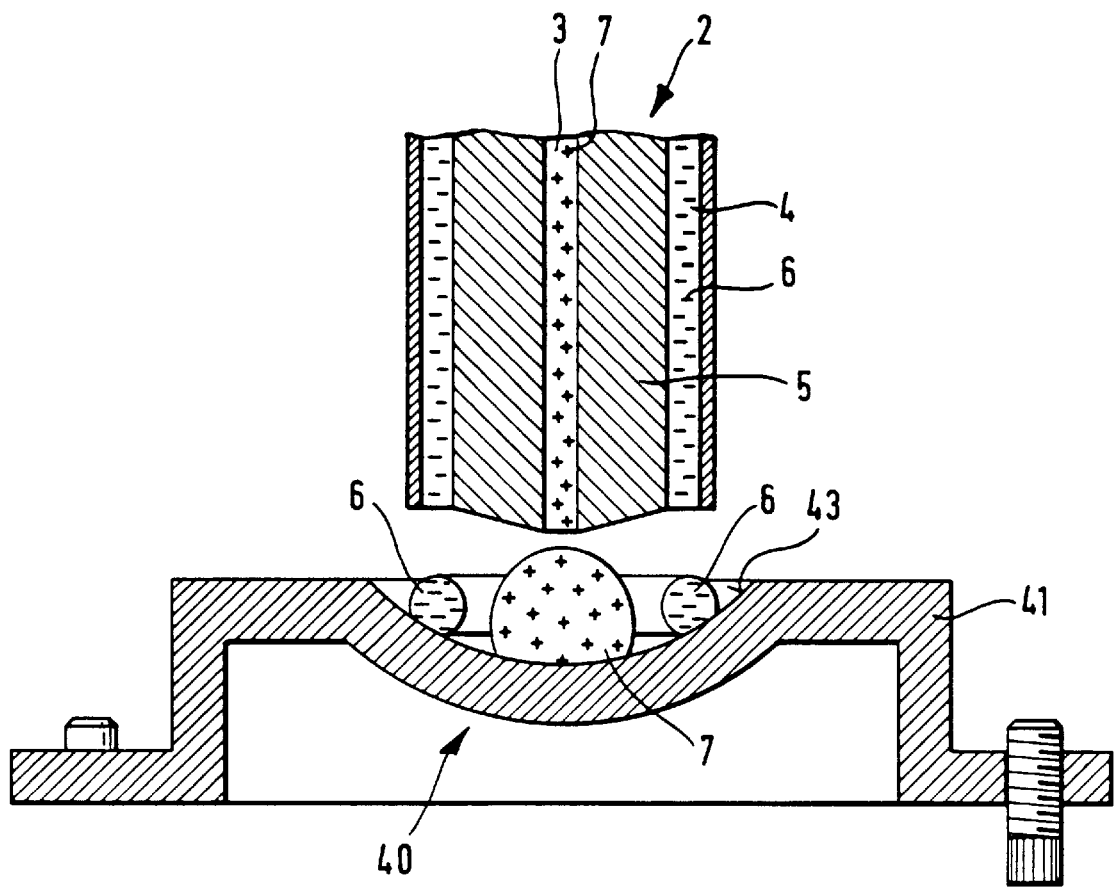
FIG. 3 shows a section, analogous to FIG. 2, through a slightly modified metering device.

The metering device shown in FIG. 3 differs from that shown in FIG. 2 essentially only in the construction of the metering needle 2, which is why the holding block 20 has not been drawn in FIG. 3. The metering needle 2 shown in FIG. 3 is especially suitable for carrying out a second embodiment of the process of the invention. Relative to the diameter of the inner nozzle 3 and to the annular diameter of the outer, annular nozzle 4, the partition wall 5 is thicker than in the metering needle shown in FIG. 2. As a result, the two polymer solutions can be so introduced into the open casting mould 40 that the coloured polymer solution 7 and the uncoloured polymer solution 6 are substantially spatially separate in the open casting mould, typically being disposed in concentric annular regions as shown on an exaggerated scale in FIG. 3.

In a third embodiment of the process of the invention, two separate metering-in operations are carried out one after the other in the same place or spatially offset from each other. It is thereby possible, for example, to introduce a coloured solution droplet into the open casting mould first and then cover it with the uncoloured polymer solution.

By suitably selecting the diameter and shape of the nozzles and the metering rates of the polymer solutions it is possible to manufacture contact lenses having any desired concentric, annular regions of different colours. If the partition wall 5 between the inner nozzle 3 and the outer, annular nozzle 4 is thin (corresponding to FIG. 2), slight mixing occurs at the contact surfaces of the two polymer solutions and the colour transitions in the contact lens are relatively fluid. If the metering needle 2 shown in FIG. 3 is used, so that the two polymer solutions are substantially spatially separate from each other and run together only when the mould is closed, then a relatively sharply defined colour boundary results. FIGS. 4, 5, 6a and 7a show schematically examples of various colour distributions in the contact lenses, which can be obtained in the contact lenses using the mentioned three embodiments of the process of the invention. The colour distribution in the contact lens is produced only after closing of the casting mould and is fixed in the closed casting mould by the crosslinking of the polymer solutions.

Figure 4:
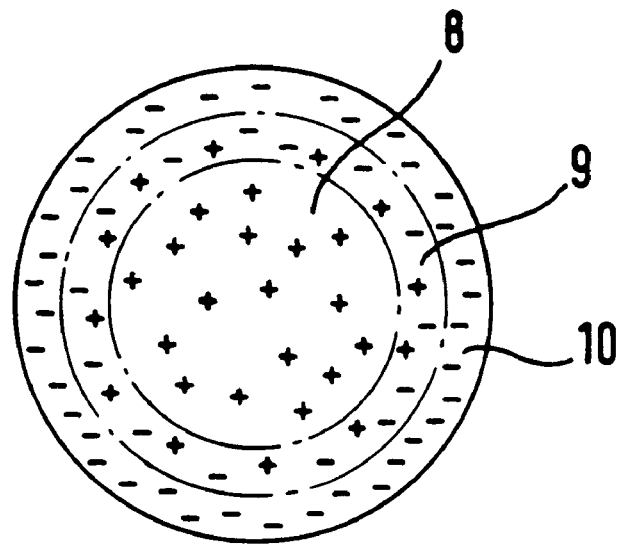
FIG. 4 is a schematic representation of a colour distribution in a contact lense manufactured according to a first embodiment of the process of the invention.
Figure 5:
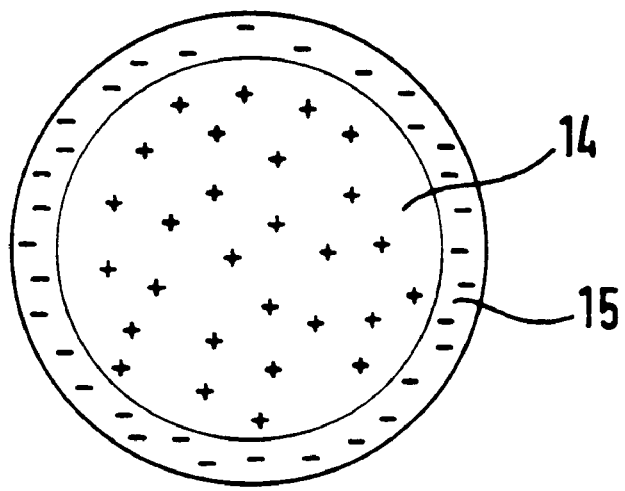
FIG. 5 is a schematic representation of a colour distribution in a contact lense manufactured according to a second embodiment of the process of the invention.

FIG. 2 shows schematically inter alia a solution droplet in the open casting mould 40 as produced by means of the metering needle 2 according to the mentioned first embodiment. The solution droplet consists of a region containing the coloured polymer solution 7 and a region containing the uncoloured polymer solution 6. As the polymer solutions are being introduced into the open casting mould, the metering needle 2 is moved in the direction of its longitudinal axis. That movement is made in such a manner that the tip of the metering needle 2 is always at the surface of the growing solution droplet throughout the introduction process. In FIG. 4, the corresponding colour distribution in the contact lens is shown. A coloured central region 8 is followed by a concentric annular region 9 that has a mixed coloration, and by a further concentric annular region 10 that is colourless.

Figure 6:
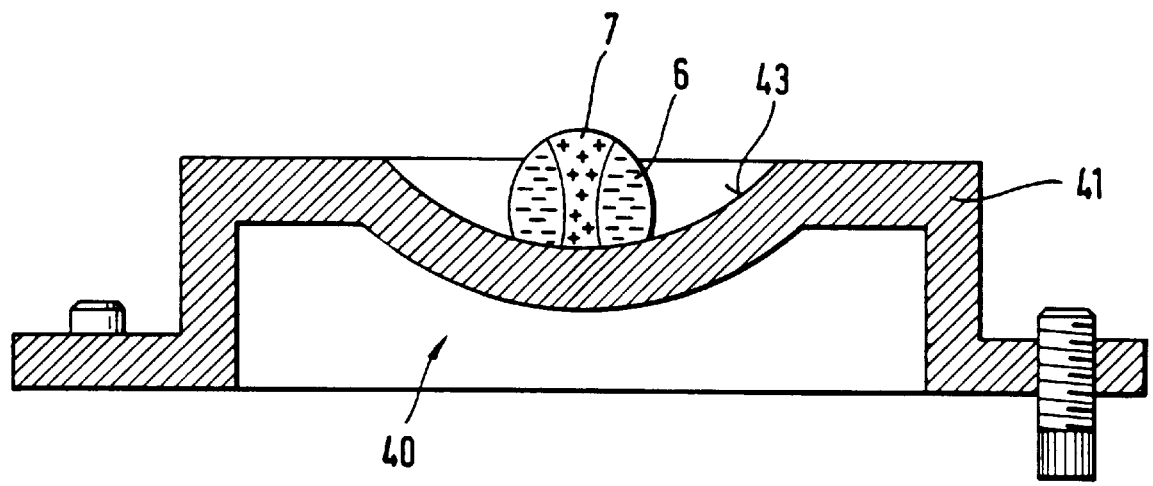
FIG. 6 shows a schematic representation of a solution droplet in the open casting mould.
Figure 6A:
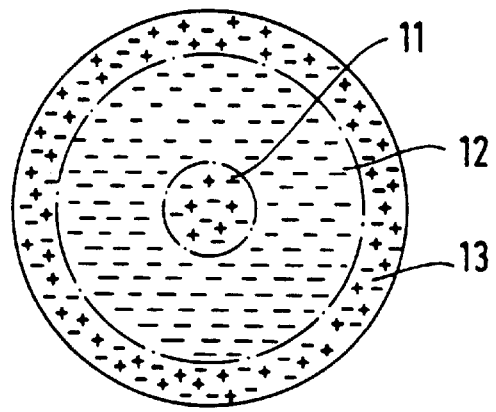
FIG. 6a is a schematic representation of the colour distribution in a contact lense manufactured from the solution droplet shown in FIG. 6.

In FIG. 6, there can be seen a solution droplet that is also produced by carrying out the first embodiment using the metering needle 2 shown in FIG. 2. In this case, however, the metering needle 2 is immersed in the growing solution droplet as the polymer solutions are being introduced into the open casting mould. The corresponding colour distribution in the contact lens is shown schematically in FIG. 6a. The central region 11 has a mixed coloration. The adjoining concentric annular region 12 is colourless and the outer concentric annular region 13 is coloured/has a mixed coloration.

In FIG. 3, there is shown schematically inter alia a distribution of the two polymer solutions introduced into the open casting mould by means of the metering needle 2 in accordance with the mentioned second embodiment. Before the casting mould is closed, the different polymer solutions are substantially spatially separate, in this example the coloured polymer solution 7 being further towards the inside and the colourless polymer solution 6 being further towards the outside. The colour distribution resulting therefrom in the contact lens is shown schematically in FIG. 5. The central region 14 is coloured and is separated from the concentric colourless outer annular region 15 by a relatively sharply defined boundary.

Figure 7:
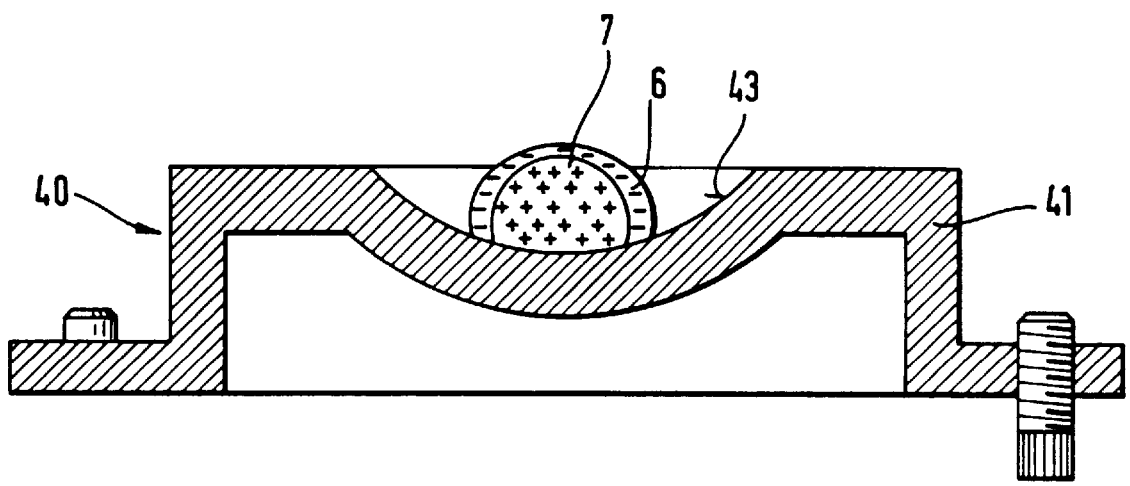
FIG. 7 shows a schematic representation of an other solution droplet in the open casting mould.
Figure 7A:
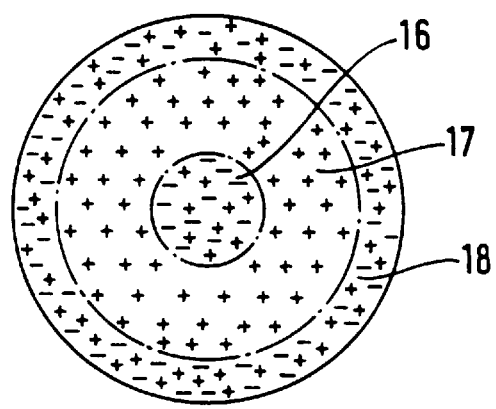
FIG. 7a is a schematic representation of the colour distribution in a contact lense manufactured from the solution droplet shown in FIG. 7.

The solution droplet shown in FIG. 7 is produced by means of the mentioned third embodiment. In this case, two individual metering-in operations are carried out separately in time. In this example, a droplet of the coloured polymer solution 7 is introduced into the open casting mould first and that droplet is then covered with the uncoloured polymer solution 6. The solution droplet accordingly consists of a region containing the coloured polymer solution 7 and a region covering the latter and containing the uncoloured polymer solution 6. The colour distribution resulting therefrom in the contact lens is shown schematically in FIG. 7a. The central region 16 has a mixed coloration. The adjoining, concentric annular region 17 is coloured and the outer annular region 18 has a mixed coloration.

In Table 2, a number of characteristic data of various process examples are summarised. For comparison purposes, corresponding data of completely uncoloured contact lenses are also given. The data are based on a metering needle 2 having an inner nozzle 3 and an outer, annular nozzle 4 into which the coloured polymer solution and the uncoloured polymer solution, respectively, are introduced from polypropylene disposable syringes having a Luerlock connection. The colourless and coloured polymer solutions are prepared as described above.

The first column contains a serial number for the individual process examples. In the second and third columns of Table 2:

A is a sol charge consisting of crosslinkable modified PVA with a 30% solids content and 0.3% Irgacure 2959, which is substantially colourless;

B is a sol charge as A which, however, contains sufficient Duasyn Blau that the dye concentration in the sol is 0.05%;

C is a sol charge as A which, however, contains sufficient Duasyn Blau that the dye concentration in the sol is 0.1%.

In the fourth column, the Figure of the drawings in which the respectively used metering needle 2 is shown is indicated. The fifth column indicates the Figure of the drawings which schematically reproduces the shape of the respectively introduced droplet; the sixth column contains the Figure of the drawings which shows the colour distribution of the respective contact lens. Columns 7 to 9 contain geometrical data of the contact lenses respectively obtained. In those columns:

MT: is the thickness of the material in the centre of the contact lens (middle thickness)

DM: is the largest diameter of the contact lens

BC: is the radius of the base curve.

In the last line of the Table, provided with the serial number 19, data typically obtained for completely uncoloured contact lenses manufactured in the same casting mould are summarised for comparison purposes.

The polymer solutions are introduced, for example, by means of separately controllable pressure-metering systems Model 1000 XLE from GLT GmbH. The metering pressure is from 3 to 5.5 bar.

For the manufacture of the contact lenses a male casting mould half made of quartz glass (SQ1) and a female casting mould half made of Duran glass are used.

The irradiation is carried out by means of a UV lamp UVPRINT 300 CM from Dr. Hönle GmbH using a 295 nm cut-off filter of 2 mm thickness from Schott. The distance between the lamp housing and the cavity in the quartz mould is 14.5 cm. The light intensity in the range of from 280 to 310 nm is 12.5 mW/m$^2$. The irradiation times are from 5 to 8 seconds.

In all the processes, the contact lenses manufactured are free of distortion. The transmission of the coloured contact lenses at 672 nm is typically 68% when using sol charge B (MT 0.095 mm) and 51.5% when using sol charge C. The geometrical data of the partly coloured contact lenses correspond to those of uncoloured contact lenses manufactured in the same mould using only one material. In addition to reproducibility, Table 2 accordingly demonstrates the finding, which was not to be expected by one skilled in the art, that partly coloured contact lenses or contact lenses having regions of different colours can be manufactured by the process of the invention with the same precision and quality as uncoloured contact lenses.

TABLE 1

| No. | weighed in mod. PVA [g] X | Na$_2$CO$_3$ 0.5% [ml] | pH value after Na$_2$CO$_3$ | weighed in dye [mg] Y | weighed in H$_2$O [g] Z | pH value after dye addition | 0.01N HCl [ml] | pH value after HCl addition |
|---|---|---|---|---|---|---|---|---|
| 1 | 30.0059 | 5.0 | 10.5 | 60.73 | 0.993 | 10.5 | 15 | 6.97 |
| 2 | 30.0038 | 5.0 | 10.5 | 29.87 | 1.052 | 10.5 | 15 | 6.98 |

TABLE 2

| No. | sol inner | sol outer | metering needle acc. to Fig. | droplet shape acc. to Fig. | colour distribution acc. to Fig. | contact lens (CL) MT [mm] | DM [mm] | BC [mm] | |
|---|---|---|---|---|---|---|---|---|---|
| 1 | B | A | 2 | 6 | 6 | 0.080 | 14.00 | 8.65 | |
| 2 | C | A | 2 | 6 | 6 | 0.083 | 14.00 | 8.60 | |
| 3 | C | A | 2 | 6 | 6 | 0.083 | 14.00 | 8.60 | |
| 4 | C | A | 2 | 6 | 6 | 0.082 | 13.95 | 8.65 | |
| 5 | C | A | 2 | 6 | 6 | 0.080 | 14.05 | 8.55 | |
| 6 | A | C | 2 | 6 | 6 | 0.082 | 14.00 | 8.50 | |
| 7 | A | C | 2 | 6 | 6 | 0.081 | 13.95 | 8.45 | |
| 8 | C | A | 2 | 6 | 6 | 0.083 | 14.05 | 8.50 | |
| 9 | C | A | 2 | 7 | 7 | 0.080 | 14.00 | 8.45 | |
| 10 | C | A | 2 | 7 | 7 | 0.084 | 14.00 | 8.40 | |
| 11 | C | A | 2 | 7 | 7 | 0.089 | 14.05 | 8.55 | |
| 12 | C | A | 2 | 7 | 7 | 0.097 | 14.10 | 8.50 | |
| 13 | C | A | 2 | 7 | 7 | 0.090 | 14.00 | 8.55 | |
| 14 | C | A | 2 | 7 | 7 | 0.085 | 13.95 | 8.55 | |
| 15 | C | A | 3 | 3 | 5 | 0.078 | 13.95 | 8.55 | |
| 16 | C | A | 2 | 7 | 7 | 0.081 | 13.95 | 8.55 | |
| 17 | C | A | 2 | 7 | 7 | 0.081 | 14.00 | 8.50 | |
| 18 | C | A | 2 | 7 | 7 | 0.079 | 13.90 | 8.60 | MT - desired values: |
| 19 | A | A | — | — | colourless | 0.09–0.102 | 13.95–13.85 | 8.35–8.50 | |
| | | | | average value coloured CL: | | 0.083 | 14.00 | 8.54 | coloured CL 0.085 mm |
| | | | | average value colourless CL: | | 0.093 | 13.91 | 8.57 | colourless CL 0.095 mm |

What is claimed is:

1. A process for the manufacture of contact lenses that are partly coloured or have regions of different colours, the process consisting essentially of the steps of introducing two or more crosslinkable materials of different colours into an open casting mould in an uncrosslinked state unmixed, wherein the crosslinkable materials are placed in the mould as a droplet or droplets; closing the casting mould; and crosslinking the crosslinkable materials in the casting mould, wherein the crosslinkable materials are crosslinked by exposure to energy.

2. A process according to claim 1, wherein the introduction of the crosslinkable materials is carried out in such a manner that they mix as little as possible in the casting mould.

3. A process according to claim 2, wherein the crosslinkable materials are introduced into the casting mould by means of coaxial metering nozzles.

4. A process according to claim 3, wherein the coaxial metering nozzles are moved relative to the casting mould during the introduction process.

5. A process according to claim 1, wherein the introduction of the crosslinkable materials is carried out in such a manner that a droplet having distinct regions is deposited in the mould, wherein each region of the droplet contains substantially only one of the crosslinkable materials.

6. A process according to claim 1, wherein the introduction of the crosslinkable materials is carried out in such a manner that the different crosslinkable materials are substantially spatially separate in the open casting mould.

7. A process according to claim 1, wherein the crosslinkable materials are introduced into the casting mould simultaneously.

8. A process according to claim 1, wherein the crosslinkable materials are introduced into the casting mould with a partial overlap in time.

9. A process according to claim 1, wherein the crosslinkable materials are introduced into the casting mould separately from each other in time.

10. A process according to claim 1, wherein one of the crosslinkable materials is substantially colourless.

11. A process according to claim 1, wherein the crosslinkable materials are water-soluble polymers.

12. A process according to claim 1, wherein the crosslinkable materials of different colours that are introduced into the casting mould in the uncrosslinked state unmixed are crosslinked together.

13. A process according to claim 1, wherein the crosslinkable materials of different colours are exposed to energy simultaneously.

14. A process according to claim 11 wherein the crosslinkable materials are derivatives of polymeric 1,2- or 1,3 diols.

15. A process according to claim 12 wherein the crosslinkable materials are derivatives of polyvinyl alcohol or derivatives of copolymers of vinyl alcohol.

16. A process for the manufacture of contact lenses that are partly coloured or have regions of different colours, the process comprising the steps of introducing two or more crosslinkable materials of different colours into an open casting mould in an uncrosslinked state unmixed, wherein the crosslinkable materials are placed in the mould by means of coaxial metering nozzles; closing the casting mould; and crosslinking the crosslinkable materials in the casting mould, wherein the crosslinkable materials are crosslinked by exposure to energy.

* * * * *